United States Patent [19]

Monteil et al.

[11] Patent Number: 5,699,141
[45] Date of Patent: Dec. 16, 1997

[54] PROGRESSIVE SIMULTANEOUS VISION OPTICAL LENS FOR CORRECTING PRESBYOPIA CORRESPONDING TO A LOW ADDITION

[75] Inventors: Pierre Monteil, Paris; Dominique Baude, Saint Ouen; Nicolas Chateau, Paris, all of France

[73] Assignee: Essilor International Compagnie Generale d'Optique, Charenton Cedex, France

[21] Appl. No.: 513,592

[22] Filed: Aug. 10, 1995

[30] Foreign Application Priority Data

Jul. 25, 1995 [FR] France .................. 95 09016

[51] Int. Cl.$^6$ .................. G02C 7/04; A61F 2/16
[52] U.S. Cl. .................. 351/161; 623/6
[58] Field of Search .................. 351/169, 161, 351/168; 623/6

[56] References Cited

U.S. PATENT DOCUMENTS 4,976,534  12/1990  Miege et al. .................. 351/161
5,530,491   6/1996  Baude et al. .................. 351/169

FOREIGN PATENT DOCUMENTS 0381567   8/1990  European Pat. Off. .
0611979   8/1994  European Pat. Off. .
2020847  11/1979  United Kingdom .

OTHER PUBLICATIONS

English language specification corresponding to European Patent application No. 0611979.

*Primary Examiner*—David C. Nelms
*Assistant Examiner*—Jordan M. Schwartz
*Attorney, Agent, or Firm*—Young & Thompson

[57] ABSTRACT

A progressive simultaneous vision optical lens for correcting presbyopia corresponding to a low addition is of the kind in which the curve representing the proximity (or power) P lies in an area between a lower envelope curve $P_{inf}$ and an upper envelope curve $P_{sup}$ having the following polynomial equations:

where h is the height relative to the axis of the optical lens, i.e. the radial distance from the latter. By appropriate choice of the coefficients $A'_i$ and $A''_i$, the near vision area is made relatively large. Applications include contact lenses, intraocular implants and intracorneal lenses.

14 Claims, 1 Drawing Sheet

PROGRESSIVE SIMULTANEOUS VISION OPTICAL LENS FOR CORRECTING PRESBYOPIA CORRESPONDING TO A LOW ADDITION

BACKGROUND OF THE INVENTION

Description of the Prior Art

U.S. Pat. No. 4,976,534 describes a progressive simultaneous vision optical lens for correcting presbyopia defined by the curve representing its proximity or, to be more precise, by the polynomial equation of that curve, it being understood that the person skilled in the art is able to determine from this polynomial equation the surface shapes for the front and/or rear faces of the optical lens for it to satisfy the corresponding proximity additions.

In this U.S. patent, the proximity curve in practise lies between envelope curves having particular polynomial equations.

As explained in this U.S. patent, the "proximity" in diopters is defined as the reciprocal of the distance in meters measured from the optical lens at which any light ray parallel to the optical axis of the lens, for example at any height h from that axis, crosses the axis after passing through the optical lens.

As also explained in U.S. Pat. No. 4,976,534, to which reference may be made, the proximity of an optical lens for correcting presbyopia must have at least two different ranges of values, namely one range of values for far vision and one range of values for near vision with, in the case of a progressive optical lens, as here, intermediate values between these two ranges of values enabling a continuous transition from far vision to near vision and vice versa in accordance with a given law.

The near vision proximity is in practise deduced from the far vision proximity by adding a particular "addition" characteristic of the presbyopia to be corrected.

In U.S. Pat. No. 4,976,534, the addition is relatively high (not less than 1.5 diopters).

The same applies to U.S. Pat. No. 5,530,491 issued Jun. 25, 1996, in which one of the far vision and near vision areas is favored over the other.

In an optical lens for correcting presbyopia the intermediate vision area between the far vision area and the near vision area must always be of non-negligible size, which is inevitably to the detriment of the size of the near vision area and/or the far vision area.

Otherwise, the proximity gradient in the intermediate vision area would be uncomfortable for the user.

The present invention is based on the observation that, for a low addition, i.e. for an addition of less than 1.5 diopters, for example, less than 1.25 diopters, it is possible by a judicious choice of the coefficients of the polynomial equation of the proximity curve to obtain a progressive simultaneous vision optical lens which, whilst having a reasonable proximity gradient in the intermediate vision area, is advantageously acceptable to all users, offers a large near vision area and has further advantages.

SUMMARY OF THE INVENTION

The present invention consists in a progressive simultaneous vision optical lens for correcting presbyopia corresponding to a low addition of the kind in which the curve representing the proximity P defined as the reciprocal in diopters of the distance measured from the optical lens at which a light ray parallel to the axis of the optical lens and at a height h relative to that axis crosses it lies within an area between a lower envelope curve $P_{inf}$ and an upper envelope curve $P_{sup}$ having the following polynomial equations:

$$P_{inf} = f(h) = \sum_{i=0}^{i=14} A'_i h^i + P_{VL}$$

$$P_{sup} = f(h) = \sum_{i=0}^{i=14} A''_i h^i + P_{VL}$$

in which $P_{VL}$ is the proximity required for far vision, in which lens the coefficients $A'_i$ for the lower envelope curve $P_{inf}$ have the following values:

$A'_0=1.0829$
$A'_1=0$
$A'_2=2.2775 \cdot 10^{-1}$
$A'_3=0$
$A'_4=-5.0659 \cdot 10^{-1}$
$A'_5=0$
$A'_6=1.6854 \cdot 10^{-1}$
$A'_7=0$
$A'_8=-2.5556 \cdot 10^{-2}$
$A'_9=0$
$A'_{10}=2.0234 \cdot 10^{-3}$
$A'_{11}=0$
$A'_{12}=-8.1333 \cdot 10^{-5}$
$A'_{13}=0$
$A'_{14}=1.3117 \cdot 10^{-6}$ and the coefficients $A''_i$ for the upper envelope curve $P_{sup}$ have the following values:

$A''_0=1.6749$
$A''_1=0$
$A''_2=-1.9230 \cdot 10^{-1}$
$A''_3=0$
$A''_4=-2.4240 \cdot 10^{-1}$
$A''_5=0$
$A''_6=9.3438 \cdot 10^{-2}$
$A''_7=0$
$A''_8=-1.4291 \cdot 10^{-2}$
$A''_9=0$
$A''_{10}=1.0986 \cdot 10^{-3}$
$A''_{11}=0$
$A''_{12}=-4.2062 \cdot 10^{-5}$
$A''_{13}=0$
$A''_{14}=6.3777 \cdot 10^{-7}$ The progressive simultaneous vision optical lens of the invention advantageously combines a near vision area that is very significantly larger than that of similar prior art lenses with an aspherical profile in the intermediate vision area corresponding to a reasonable proximity gradient, in practise a proximity gradient of between 0.6 diopter per mm and 1.5 diopters per mm.

The near vision area can in practise extend to a height h relative to the axis of the optical lens between 0.8 mm and 1.1 mm, to the benefit of user comfort.

The far vision area can itself be relatively large.

It is in practise entirely feasible for the far vision area to extend to a height h relative to the axis of the optical lens equal to at least 3 mm, which is also to the benefit of user comfort, all the more so in that the average pupil diameter tends to be larger in persons requiring a low addition than in persons requiring a higher addition.

Furthermore, the tolerances in respect of the proximity in the far vision area advantageously remain relatively small, being in practise in the order of ±0.2 diopter.

The features and advantages of the invention will emerge from the following description given by way of example with reference to the appended diagrammatic drawings.

DETAILED DESCRIPTION OF THE PREFERRED EMBODIMENTS

Figure 1:
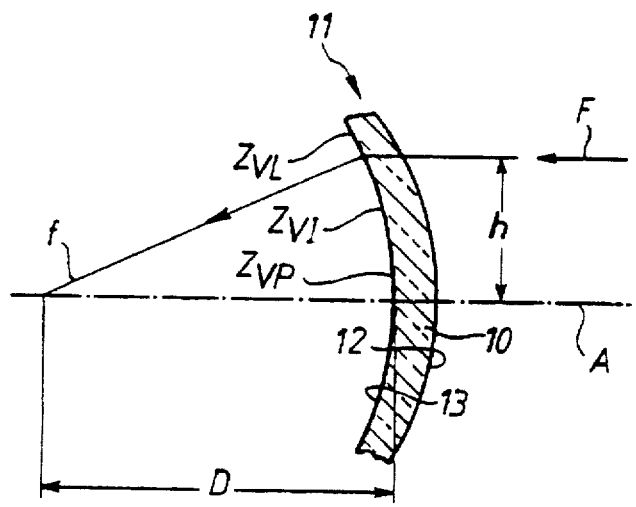
FIG. 1 is a partial view in axial section of an optical lens in accordance with the invention.

Referring to FIG. 1, the active part 11 of an optical lens 10 of the invention, which can be a contact lens, an intraocular implant or an intracorneal lens, is a symmetrical body of revolution about an axis A.

This active part is in practise its central part.

In the embodiment shown, the optical lens 10 of the invention is a concave/convex convergent optical lens for example, i.e. its front face 12 is generally convex and its rear face 13 is generally concave.

Any incident light ray F parallel to the axis A at a height h relative to the axis A, the height h being equal to its radial distance from the latter, crosses the axis A at a point f at a distance D from the optical lens 10 after passing through the latter.

The proximity P in diopters is equal to the reciprocal of the distance D in meters. (The same goes for the power, in practise the sagittal power, if the latter concept is preferred to the proximity concept).

In the way that is known in itself, in which connection reference is made again to U.S. Pat. No. 4,976,534, previously referred to hereinabove, the proximity P varies with the height h so that in the active part 11 of the optical lens 10 it is possible to distinguish three concentric annular areas, namely a far vision area $Z_{VL}$ in which the value of the proximity P is suited to far vision, a near vision area $Z_{VP}$ in which the value of the proximity P is suitable for near vision and an intermediate vision area $Z_{VI}$ between the first two areas and in which the value of the proximity P varies continuously from one to the other of the corresponding two values.

In the embodiment shown, the far vision area $Z_{VL}$ is in the peripheral part 11 of the optical lens 10 and the near vision area $Z_{VP}$ is in its central portion.

The opposite configuration is feasible, however. All that is required is symmetry about the straight line of equation $P=f(h)=P_{VL}$ of the curve representing the proximity P.

Figure 2:
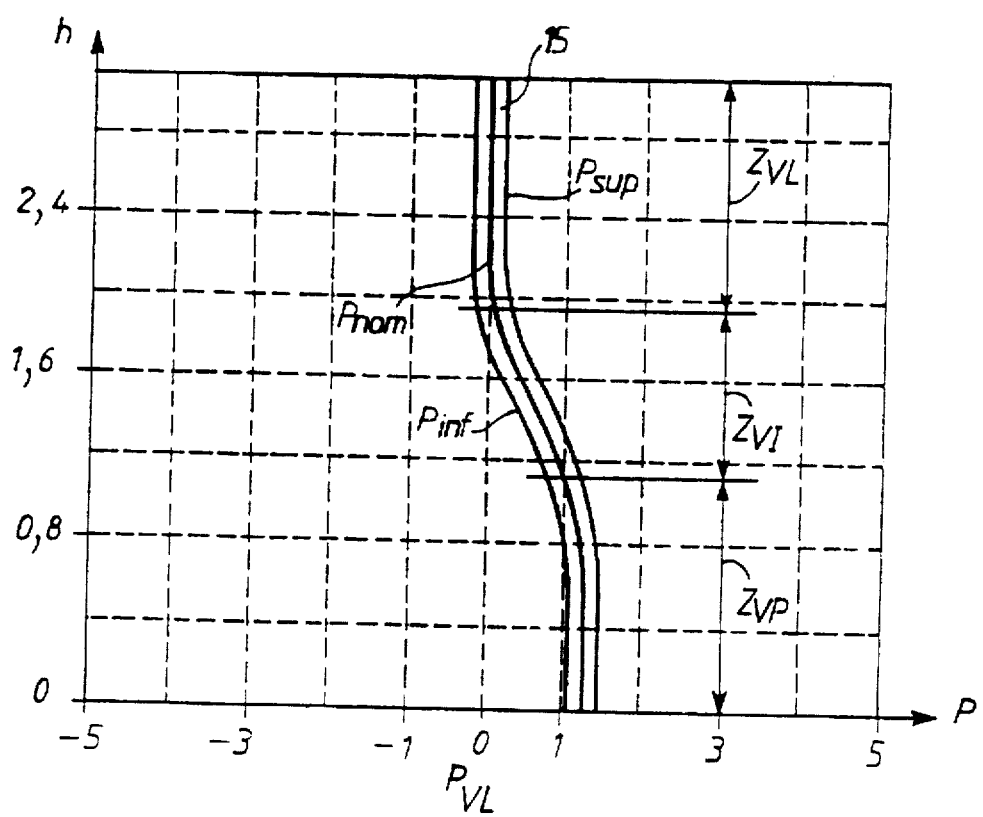
FIG. 2 is a diagram showing the proximity of this optical lens.

As shown in FIG. 2, in which the proximity P is plotted on the abscissa axis as a function of the height h plotted on the ordinate axis, the curve $P_{nom}$ representing the proximity P is in practise in an area 15 between a lower envelope curve $P_{inf}$ and an upper envelope curve $P_{sup}$ which have the following polynomial equations:

$$P_{inf} = f(h) = \sum_{i=0}^{i=14} A'_i h^i + P_{VL}$$

$$P_{sup} = f(h) = \sum_{i=0}^{i=14} A''_i h^i + P_{VL}$$

By appropriately choosing the coefficients $A'_i$ and $A''_i$, the proximity P has respective stable (i.e. substantially constant) values $P_{VL}$, $P_{VP}$ in the far vision area $Z_{VL}$ and the near vision area $Z_{VP}$, respectively.

To be more precise, in the far vision area $Z_{VL}$ and in the near vision area $Z_{VP}$ the proximity P has the respective stable values $P_{VL}$ and $P_{VP}$.

The difference between these values $P_{VL}$ and $P_{VP}$ constitutes the addition to which the presbyopia to be corrected corresponds.

The optical lens 10 of the invention is in practise intended to correct presbyopia corresponding to a relatively low addition.

By relatively low addition in this context is meant an addition less than 1.5 diopters and in practise less than 1.25 diopters.

Given these conditions, and in accordance with the invention, the coefficients $A'_i$ for the lower envelope curve $P_{inf}$ have the following values:

$A'_0 = 1.0829$
$A'_1 = 0$
$A'_2 = 2.2775 \cdot 10^{-1}$
$A'_3 = 0$
$A'_4 = -5.0659 \cdot 10^{-1}$
$A'_5 = 0$
$A'_6 = 1.6854 \cdot 10^{-1}$
$A'_7 = 0$
$A'_8 = -2.5556 \cdot 10^{-2}$
$A'_9 = 0$
$A'_{10} = 2.0234 \cdot 10^{-3}$
$A'_{11} = 0$
$A'_{12} = -8.1333 \cdot 10^{-5}$
$A'_{13} = 0$
$A'_{14} = 1.3117 \cdot 10^{-6}$ and the coefficients $A''_i$ for the upper envelope curve $P_{sup}$ have the values:

$A''_0 = 1.6749$
$A''_1 = 0$
$A''_2 = -1.9230 \cdot 10^{-1}$
$A''_3 = 0$
$A''_4 = -2.4240 \cdot 10^{-1}$
$A''_5 = 0$
$A''_6 = 9.3438 \cdot 10^{-2}$
$A''_7 = 0$
$A''_8 = -1.4291 \cdot 10^{-2}$
$A''_9 = 0$
$A''_{10} = 1.0986 \cdot 10^{-3}$
$A''_{11} = 0$
$A''_{12} = -4.2062 \cdot 10^{-5}$
$A'_{13} = 0$
$A''_{14} = 6.3777 \cdot 10^{-7}$ More generally, the curve $P_{nom}$ representing the proximity P of the optical lens 10 of the invention has the following polynomial equation:

$$P_{nom} = f(h) = \sum_{i=0}^{i=14} A_i h^i + P_{VL}$$

with the following values for the coefficients $A_i$:

$A_0 = 1.2629$
$A_1 = 0$
$A_2 = 2.2775 \cdot 10^{-1}$
$A_3 = 0$
$A_4 = -5.0659 \cdot 10^{-1}$
$A_5 = 0$
$A_6 = 1.685 \cdot 10^{-1}$
$A_7 = 0$
$A_8 = -2.5556 \cdot 10^{-2}$
$A_9 = 0$
$A_{10} = 2.0234 \cdot 10^{-3}$
$A_{11} = 0$
$A_{12} = -8.1333 \cdot 10^{-5}$
$A_{13} = 0$
$A_{14} = 1.3117 \cdot 10^{-6}$ As shown in FIG. 2, the near vision area then extends to a height h equal to 0.8 mm or 1.1 mm.

Note also that the proximity gradient in the intermediate vision area $Z_{VI}$ is still reasonable, being in practise between 0.6 diopter per mm and 1.5 diopters per mm, with a nominal value in the order of 1.2 diopters per mm.

Of course, the present invention is not limited to the embodiment described and shown, but encompasses any variant execution thereof.

There is claimed:

1. Progressive simultaneous vision optical lens for correcting presbyopia having a low addition in which the curve representing the proximity P defined as the reciprocal in diopters of the distance measured from the optical lens at which a light ray parallel to the axis of the optical lens and at a height h relative to that axis crosses it lies within an area between a lower envelope curve $P_{inf}$ and an upper envelope curve $P_{sup}$ having the following polynomial equations:

$$P_{inf} = f(h) = \sum_{i=0}^{i=14} A'_i h^i + P_{VL}$$

$$P_{sup} = f(h) = \sum_{i=0}^{i=14} A''_i h^i + P_{VL}$$

in which $P_{VL}$ is the proximity required for far vision, in which lens the coefficients $A'_i$ for the lower envelope curve $P_{inf}$ have the following values:
$A'_0=1.0829$
$A'_1=0$
$A'_2=2.2775 \cdot 10^{-1}$
$A'_3=0$
$A'_4=-5.0659 \cdot 10^{-1}$
$A'_5=0$
$A'_6=1.6854 \cdot 10^{-1}$
$A'_7=0$
$A'_8=-2.5556 \cdot 10^{-2}$
$A'_9=0$
$A'_{10}=2.0234 \cdot 10^{-3}$
$A'_{11}=0$
$A'_{12}=-8.1333 \cdot 10^{-5}$
$A'_{13}=0$
$A'_{14}=1.3117 \cdot 10^{-6}$
and the coefficients $A''_i$ for the upper envelope curve $P_{sup}$ have the following values:
$A''_0=1.6749$
$A''_1=0$
$A''_2=-1.9230 \cdot 10^{-1}$
$A''_3=0$
$A''_4=-2.4240 \cdot 10^{-1}$
$A''_5=0$
$A''_6=9.3438 \cdot 10^{-2}$
$A''_7=0$
$A''_8=-1.4291 \cdot 10^{-2}$
$A''_9=0$
$A''_{10}=1.0986 \cdot 10^{-3}$
$A''_{11}=0$
$A''_{12}=-4.2062 \cdot 10^{-5}$
$A''_{13}=0$
$A''_{14}=6.3777 \cdot 10^{-7}$.

2. Optical lens according to claim 1 wherein the curve $P_{nom}$ representing said proximity P has the following polynomial equation:

$$P_{nom} = f(h) = \sum_{i=0}^{i=14} A_i h^i + P_{VL}$$

with the following values for the coefficients $A_i$:
$A_0=1.2629$
$A_1=0$
$A_2=2.2775 \cdot 10^{-1}$
$A_3=0$
$A_4=-5.0659 \cdot 10^{-1}$
$A_5=0$
$A_6=1.6854 \cdot 10^{-1}$
$A_7=0$
$A_8=-2.5556 \cdot 10^{-2}$
$A_9=0$
$A_{10}=2.0234 \cdot 10^{-3}$
$A_{11}=0$
$A_{12}=-8.1333 \cdot 10^{-5}$
$A_{13}=0$
$A_{14}=1.3117 \cdot 10^{-6}$.

3. Optical lens according to claim 1, wherein the addition is less than about 1.25 diopters.

4. Optical lens according to claim 1, wherein the maximum height of the near vision area is between 0.8–1.1 mm from the axis of the optical lens.

5. Optical lens according to claim 1, wherein the height of the near vision area extends to about 1.1 mm from the axis of the optical lens.

6. Optical lens according to claim 1, wherein the near vision area extends from a height corresponding to the axis of the optical lens to a height of about 1.1 mm from the axis.

7. Optical lens according to claim 6, wherein the far vision area extends from a height of about 1.9 mm to about 3 mm from the axis of the optical lens.

8. Optical lens according to claim 1 wherein a range of height of the near vision area and a range of height of the far vision area are both greater than a range of height of the intermediate vision area therebetween.

9. Optical lens according to claim 2, wherein the addition is less than about 1.25 diopters.

10. Optical lens according to claim 2, wherein the maximum height of the near vision area is between 0.8–1.1 mm from the axis of the optical lens.

11. Optical lens according to claim 2, wherein the height of the near vision area extends to about 1.1 mm from the axis of the optical lens.

12. Optical lens according to claim 2, wherein the near vision area extends from a height corresponding to the axis of the optical lens to a height of about 1.1 mm from the axis.

13. Optical lens according to claim 2, wherein the far vision area extends from a height of about 1.9 mm to about 3 mm from the axis of the optical lens.

14. Optical lens according to claim 2, wherein a range of height of the near vision area and a range of height of the far vision area are both greater than a range of height of the intermediate vision area therebetween.

* * * * *